UNITED STATES PATENT OFFICE.

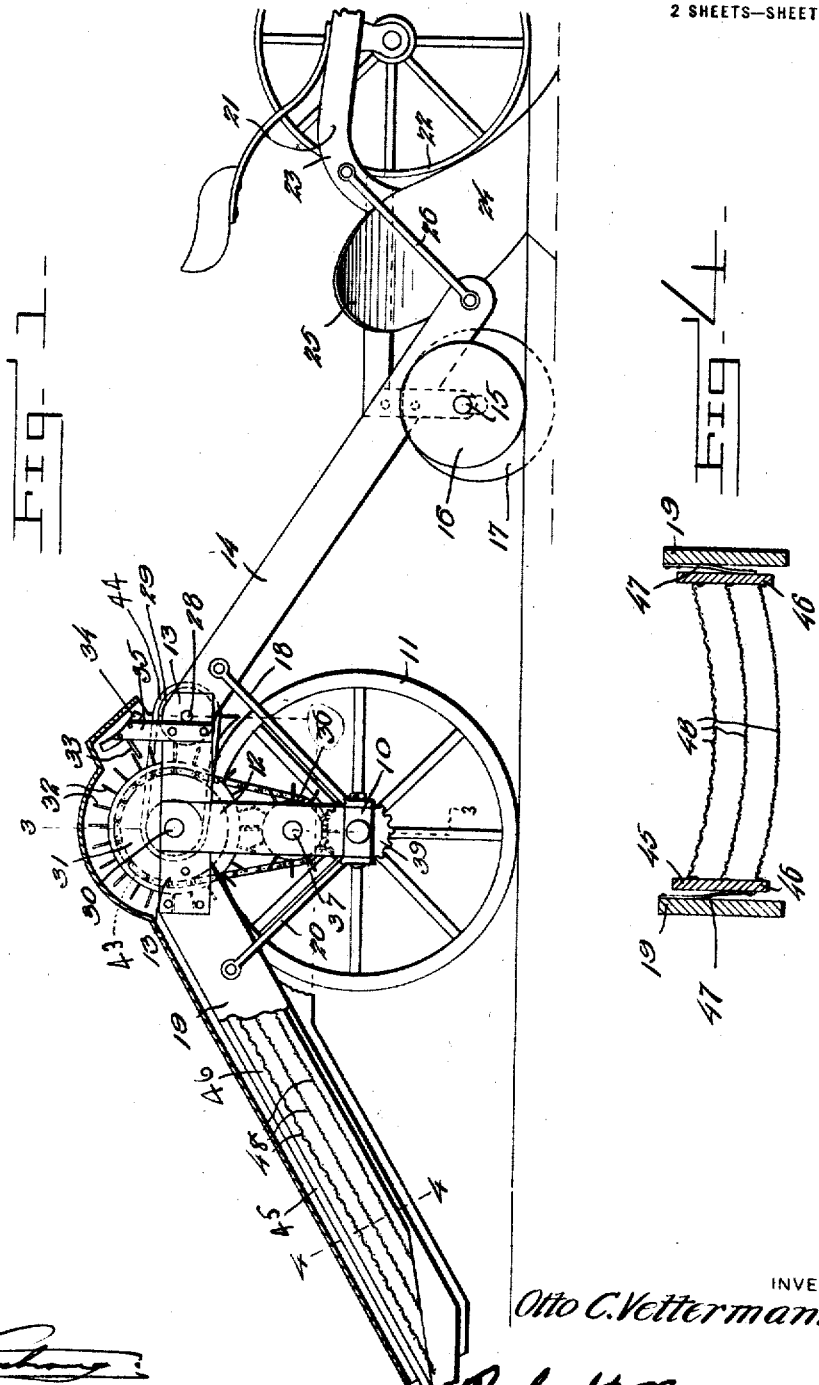

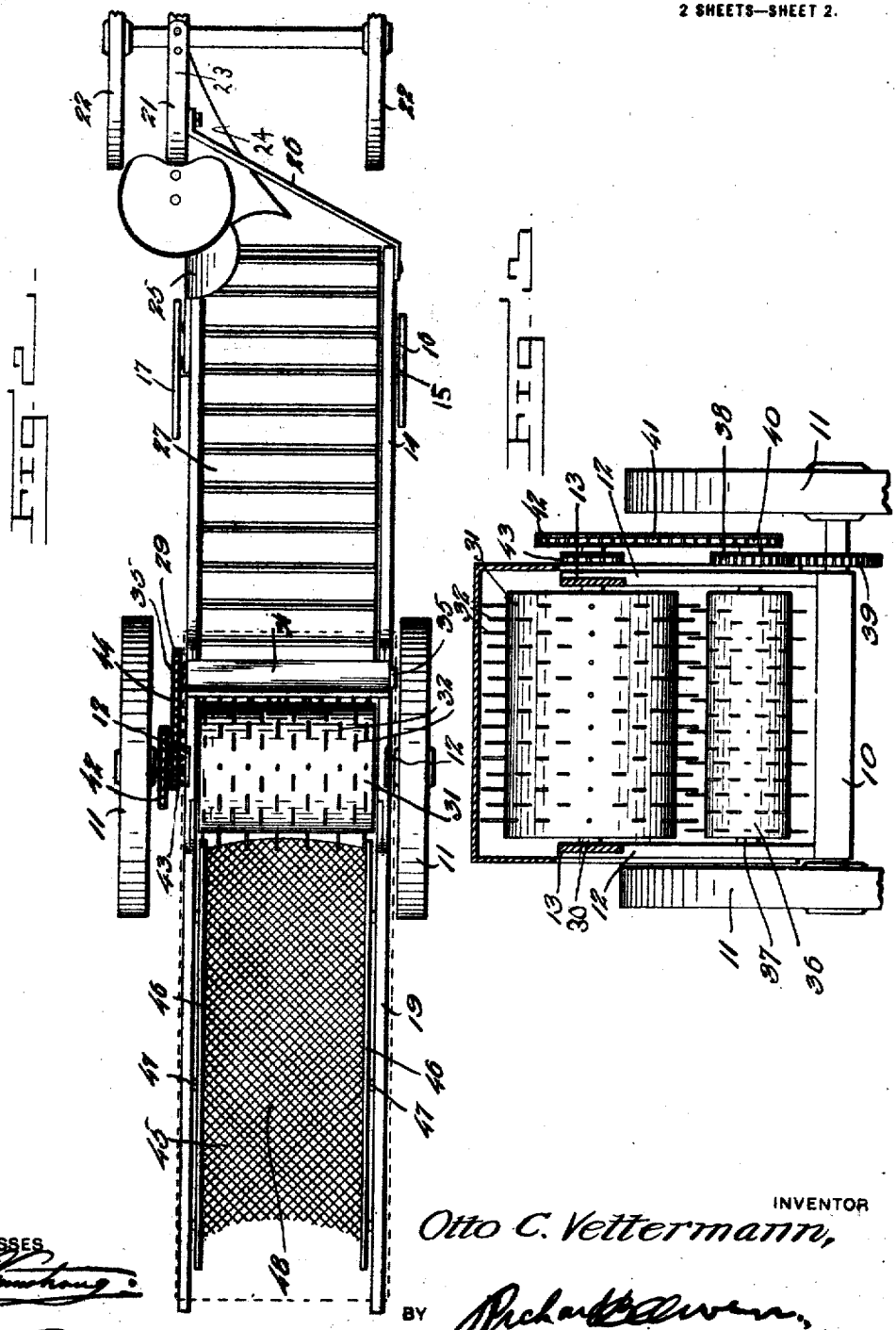

OTTO C. VETTERMANN, OF PINGREE GROVE, ILLINOIS.

GRASS-DESTROYING MACHINE.

1,293,584.   Specification of Letters Patent.   Patented Feb. 4, 1919.

Application filed December 1, 1916, Serial No. 134,355. Renewed December 12, 1918. Serial No. 266,497.

*To all whom it may concern:*

Be it known that I, OTTO C. VETTERMANN, a citizen of the United States, residing at Pingree Grove, in the county of Kane and State of Illinois, have invented certain new and useful Improvements in Grass-Destroying Machines, of which the following is a specification.

This invention has relation to agricultural machines, with special reference to a machine for destroying weeds, quack grass, or the like.

An object of the invention is to provide a quack grass destroying machine embodying means whereby the surface of the earth may be lifted to a depth sufficient to include all of the roots of the grass whereby the roots and earth may be subsequently separated and the vegetation destroyed.

Another object of the invention is to provide a quack grass destroying machine, having the above named characteristics and embodying means whereby the earth and grass may be separated, the grass torn as thoroughly as possible, and thereafter deposited upon a novel arrangement of separating screens whereby the earth may be shaken from the roots and redeposited upon the ground, and the cleaned roots and vegetation deposited upon the surface of the ground for exposure to the elements whereby the grass is destroyed.

In addition to the foregoing my invention comprehends improvements in the details of construction and arrangement of parts to be hereinafter more fully described and particularly set forth in the appended claim.

In the accompanying drawings in which similar and corresponding parts are designated by the same characters of reference throughout the several views in which they appear:

Figure 1, is a view in side elevation partly in section of a quack grass destroying machine constructed after the manner of my invention.

Fig. 2, is a view thereof in plan.

Fig. 3, is a transverse sectional view taken on the line 3—3 of Fig. 1, and

Fig. 4, is a transverse detail section taken on the line 4—4 of Fig. 1.

With reference to the drawings 10 indicates a transversely extending horizontal axle having a supporting wheel 11 at each end thereof. Erected upon the axle 10 is a pair of transversely spaced vertical frame members 12 having at their upper ends longitudinally extending horizontal frame bars 13. An inclined carrier frame 14 is mounted at its upper end between the forward ends of the horizontal frame bars 13, said carrier frame depending forwardly and supported at its forward end upon a transverse crank axle 15 having at its right hand end a relatively small ground wheel 16 and at its left hand end a relatively large supporting wheel 17 adapted to ride in a furrow. In addition to being supported upon the horizontal frame bars 13, the carrier is supported also through the medium of auxiliary braces 18 secured at their upper ends to the carrier and at their lower ends to the axle 10.

Depending rearwardly is a shaker frame 19 having its upper end secured between the rearward extending portions of the horizontal frame bars 13 and partly supported through the medium of braces 20 secured at their upper ends to the shaker frame and at their lower ends to the axle 10.

A sulky plow indicated generally at 21 is provided and includes the usual supporting wheels 22, plow beam 23, associated with the axle of the plow, the plow being indicated at 24, the mold board 25 thereof being curved to an unusual degree in order to extend over the lower end of the carrier frame 14. A brace 26 connects the lower end of the carrier frame with the plow beam in order that the carrier frame and consequently the machine as a whole may be guided when moved by corresponding movement of the sulky plow.

The carrier frame 14 supports an endless carrier 27 which is adapted to move in contiguous relation to the carrier frame and around rollers journaled at the lower and upper ends of the frame. The upper roller is supported upon a transversely extending shaft 28, and a sprocket wheel 29 is fixedly secured to said shaft for rotation therewith.

Journaled upon the upper end of the vertical frame members 12, is a transversely extending shaft 30 adapted to fixedly support thereon a roller 31 provided with radially extending teeth 32 upon its surface for coaction with the teeth 33 of a bar 34 which extends longitudinally of the cylinder and is disposed in spaced relation therefrom upon vertical frame members 35 supported at their lower ends upon the forwardly extending portion of the horizontal frame members 13.

The roller 31 is a comminuting roller, and located therebeneath in parallelism is a cleaning roller 36 similarly provided upon its surface with radially extending teeth for inter-engagement with the teeth 32 of the roller 31, said roller 36 being likewise mounted upon a shaft 37 which is journaled in the vertical frame members 12. The shaft 37 has fixedly supported thereupon a spur gear 38 for meshing engagement with a similar gear 39 rotatable with one of the supporting wheels 11, and a sprocket 40 is also secured to the shaft 37, around which passes a chain 41, which chain also passes around a sprocket 42, fixedly mounted upon the shaft 30 of the comminuting roller 31. The sprocket 42 is preferably of a diameter considerably greater than that of the sprocket 40, in order that a different ratio of movement may take place between the rollers 31 and 36. The upper shaft 30 also supports a sprocket 43 around which a chain 44 passes, said chain also passing around the beforesaid mentioned sprocket 29 of the upper carrier roller.

The rear shaker frame 19 is extended rearwardly and downwardly at the proper inclination to feed the material deposited thereon downwardly by gravity, and a shaker frame designated generally 45 is disposed therein which frame comprises side bars 46 disposed in contiguous relation to the frame members of the shaker frame 19, said frame 45 being supported from the frame 19 through the medium of links 47 having pivotal connection at their ends to the frame members 46 and 19 respectively, whereby the shaker frame 45 may be given an oscillatory movement.

Stretched between the side members 46 of the frame 47, are a trio of screen members 48 disposed in superposed spaced relation, which members may be formed of wire mesh, perforated or other foraminous material, the degree of fineness of the material of the different members varying, thus, the lower screen member being of finer mesh than those next above it. In operation, the machine is drawn along the ground by animals or mechanical power applied to the sulky plow, and during forward motion of the machine, the top soil is raised from the ground, and deposited by curvature of the mold board upon the lower end of the endless carrier 27. Rotation of the ground wheels 11 is transmitted through the medium of the gears 39 and 38, and sprockets 40 and 42 to the upper comminuting roller 31, and the endless carrier in an obvious manner. The carrier is actuated to move the upper stretch thereof in an upward direction, thereby carrying the soil including the weeds and quack grass to the upper end of the carrier whereupon the earth and grass are caught by the teeth of the comminuting roller and pulled or otherwise forced between the stationary teeth 33 whereupon the vegetation is torn and loosened from the soil. The soil and torn plants are carried over and deposited upon the upper screen member 48, and owing to the motion of the machine over the ground, the shaker frame 45 is given an oscillatory movement whereby the remaining earth is shaken from the roots of the plants, and permitted to fall through the meshes of the screen section 48 thereby cleaning the plants. The comminuted plants will thus be redeposited upon the surface of the ground in a more or less disrupted condition, whereby life in them is destroyed, and action of the elements from either the sun or frost will subsequently decompose the plants.

Owing to the ratio of the rate of movement between the comminuting roller 31 and the lower cleaning roller 36, any plants which may be caught upon the teeth 32 of the comminuting roller will be removed therefrom by the teeth of the lower roller 36 whereby the comminuting roller is constantly cleaned and maintained in an effective condition.

Thus, it will be seen that I have provided a novel and effective machine whereby quack grass may be absolutely destroyed, and the roots thereof disrupted and torn in such a manner that further propagation of the plant is impossible. I have furthermore provided a machine in which the parts thereof are arranged in a new and novel manner, and wherein all unnecessary mechanism is eliminated, thereby insuring simplicity of operation and economy in the cost of manufacture.

While I have illustrated and described my invention with some degree of particularity I realize that in practice various alterations thereover may be made and I therefore reserve the right and privilege of changing the form of the details of construction or otherwise altering the arrangement of the parts without departing from the spirit of the invention or the scope of the appended claim.

Having thus described my invention what I claim as new and desire to secure by Letters Patent is:

In a grass destroying machine, a frame, a pair of spaced bars within the frame, a plurality of leaf springs rigidly connected at one of their ends to the frame and depending for resilient connection at their other ends to the bars to support the same and to permit movement of the bars toward and away from each other as well as longitudinally, a trough shaped strip of wire fabric of relatively coarse mesh disposed between the boards, a second strip of wire fabric of fine mesh disposed therebetween in spaced relation to the first strip, and a third strip located between said strips of intermediate mesh, said bars moving toward and away from each other longitudinally when the structure is agitated.

In testimony whereof I affix my signature in presence of two witnesses.

OTTO C. VETTERMANN.

Witnesses:
R. KRAMER,
E. H. KRUEGER.